United States Patent
Tene et al.

(10) Patent No.: US 9,336,005 B2
(45) Date of Patent: *May 10, 2016

(54) COOPERATIVE PREEMPTION

(71) Applicant: Azul Systems, Inc., Sunnyvale, CA (US)

(72) Inventors: Gil Tene, Los Altos Hills, CA (US); Michael A. Wolf, San Francisco, CA (US); Scott Sellers, Menlo Park, CA (US); Jack H. Choquette, Palo Alto, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 13/963,879

(22) Filed: Aug. 9, 2013

(65) Prior Publication Data

US 2014/0082632 A1    Mar. 20, 2014

Related U.S. Application Data

(63) Continuation of application No. 11/228,034, filed on Sep. 14, 2005, now Pat. No. 8,544,020.

(60) Provisional application No. 60/610,028, filed on Sep. 14, 2004.

(51) Int. Cl.
*G06F 9/46* (2006.01)
*G06F 9/38* (2006.01)
*G06F 9/30* (2006.01)
*G06F 9/345* (2006.01)
*G06F 9/355* (2006.01)

(52) U.S. Cl.
CPC ............ *G06F 9/3842* (2013.01); *G06F 9/3001* (2013.01); *G06F 9/3004* (2013.01); *G06F 9/30032* (2013.01); *G06F 9/30087* (2013.01); *G06F 9/345* (2013.01); *G06F 9/355* (2013.01); *G06F 9/3834* (2013.01); *G06F 9/3857* (2013.01); *G06F 9/3863* (2013.01); *G06F 9/461* (2013.01)

(58) Field of Classification Search
None
See application file for complete search history.

(56) References Cited

U.S. PATENT DOCUMENTS

| | | | | | |
|---|---|---|---|---|---|
| 6,047,390 | A | * | 4/2000 | Butt et al. | 714/43 |
| 6,049,817 | A | * | 4/2000 | Schoen et al. | 718/102 |
| 6,167,424 | A | * | 12/2000 | Bak et al. | 718/100 |
| 6,360,243 | B1 | * | 3/2002 | Lindsley et al. | 718/103 |
| 6,374,286 | B1 | * | 4/2002 | Gee et al. | 718/108 |
| 6,487,652 | B1 | * | 11/2002 | Gomes et al. | 712/23 |
| 6,523,059 | B1 | * | 2/2003 | Schmidt | 718/100 |
| 6,625,635 | B1 | * | 9/2003 | Elnozahy | 718/102 |
| 6,952,825 | B1 | * | 10/2005 | Cockx et al. | 718/102 |
| 7,013,454 | B2 | * | 3/2006 | Bush et al. | 717/124 |
| 7,080,374 | B2 | * | 7/2006 | Dahlstedt et al. | 718/1 |
| 7,145,913 | B2 | * | 12/2006 | Craig et al. | 370/401 |
| 7,478,204 | B2 | * | 1/2009 | McKenney et al. | 711/151 |
| 7,536,690 | B2 | * | 5/2009 | Alverson et al. | 718/102 |
| 2004/0117793 | A1 | * | 6/2004 | Shaylor | 718/100 |
| 2005/0066302 | A1 | * | 3/2005 | Kanade | 717/100 |

* cited by examiner

*Primary Examiner* — Adam Lee

(74) *Attorney, Agent, or Firm* — Van Pelt, Yi & James LLP

(57) ABSTRACT

Preempting the execution of a thread is disclosed. Preempting includes receiving an indication that a preemption of the thread is desired and context switching the thread out at a thread safe point in the event that a thread safe point is reached.

35 Claims, 8 Drawing Sheets

Kernel

COOPERATIVE PREEMPTION

CROSS REFERENCE TO OTHER APPLICATIONS

This application is a continuation of co-pending U.S. patent application Ser. No. 11/228,034, entitled COOPERATIVE PREEMPTION filed Sep. 14, 2005 which is incorporated herein by reference for all purposes, which claims priority to U.S. Provisional Patent Application No. 60/610,028 entitled VIRTUAL MACHINE filed Sep. 14, 2004, which is incorporated herein by reference for all purposes.

BACKGROUND OF THE INVENTION

In virtual machines and in other systems, the state of the machine is generally not fully known at all points in time. For example, as code is being executed, there may be partial results computed for pointers and stored in registers. A safe point is a point in the code where enough state is known that certain operations can be safely performed. For example, it may be desirable to bring a thread to a safe point to scan its stack for pointers that need to be followed or modified during garbage collection. It may be desirable to bring all threads in a virtual machine to a safe point to perform garbage collection, debugging, or other safe operations. Typically, a context switch between threads may occur at any point in the code, with the operating system preempting a running thread at what appears to be a random instruction. In this typical situation, when a request to bring the threads to a safe point is received, each of the threads needs to be context switched back in and brought to a safe point. This process can be computationally expensive and time consuming, and lengthens the time it takes to perform operations that require safe points. Improved methods of context switching, thread preemption, and reaching a safe point are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
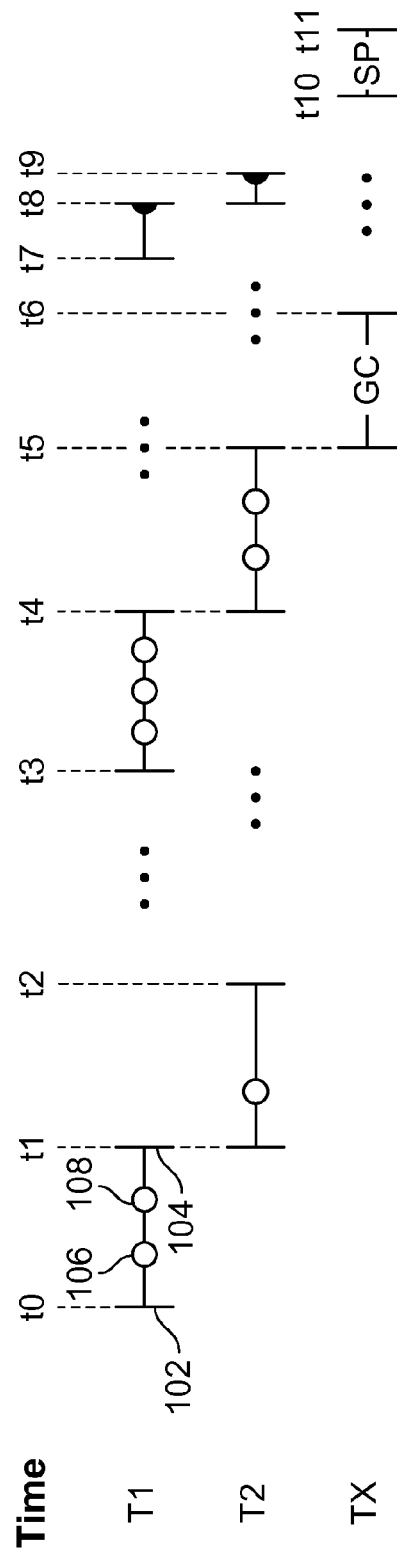
FIG. 1A is a diagram illustrating an example of a plurality of threads running on a single processor.

FIG. 1A is a diagram illustrating an example of a plurality of threads running on a single processor. In the example shown, thread T1 is context switched on to the processor at time t0, as indicated by start quantum indicator 102. A quantum refers to a time slice, or an amount of time that a processor allows a thread to run. At time t1, the quantum expires as indicated by end quantum indicator 104, and thread T1 is preempted, context switched out and thread T2 is context switched in. At time t2, thread T2 is preempted, context switched out and the next thread (not shown) is context switched in. Context switching proceeds through the rest of the plurality of threads.

Between time t0 and time t1, thread T1 has two potential safe points 106 and 108. As used herein, a thread safe point refers to the point at which a thread is at a safe point. A global safe point refers to a point at which each thread running on a machine is at a safe point. Thus, safe points 106 and 108 can also be referred to as thread safe points.

Thread T2 has one thread safe point between time t1 and time t2, thread T1 has three thread safe points between time t3 and time t4, and thread T2 has two thread safe points between time t4 and time t5. At time t5 a thread TX is context switched in. Thread TX requests that all threads be at a safe point (i.e., a global safe point), e.g., to perform garbage collection. Each thread must then be context switched back in in order to reach a thread safe point. In this example, thread TX blocks, waiting for the global safe point to occur, and is context switched out at time t6. Then thread T1 is context switched back in at time t7, reaches a thread safe point, enters the thread safe point, and at time t8, blocks on an attempt to leave the thread safe point, and is context switched out. Then thread T2 is context switched in, reaches a thread safe point, enters the thread safe point, and at time t9, blocks in an attempt to leave the thread safe point and is context switched out. After each of the plurality of threads has been context switched back in, reached and entered a thread safe point, all threads are at a thread safe point, and the global safe point is reached. (In this diagram, a filled in circle indicates that the thread has entered a thread safe point.) When the global safe point is reached, thread TX becomes ready to run and is context switched back in at time t10. At this point safe operations (e.g., garbage collection) can be performed. At time t11, the safe operations are complete, and thread TX releases the thread safe points and can be context switched out. The threads T1 and T2 can now proceed in leaving their thread safe points. Releasing the thread safe points of threads T1 and T2 makes them ready to run, and they continue execution from their previously blocked points.

As used herein, context switching refers to the process of switching from one thread to another on a processor. Context switching includes preemption. Preemption refers to a context switch wherein the thread is context switched before the thread –, blocks, or somehow indicates that it is finished executing (e.g., when the thread has finished execution). Preemption occurs when the context switch interrupts the thread. For example, preemption may occur when a quantum has expired. Preemption may be event driven. For example, when a thread of higher priority becomes ready to run, a currently running (lower priority) thread may be preempted.

As used herein, being at a thread safe point (also referred to as reaching a safe point) refers to a thread executing at a point in code that is known to be a safe point. For example, a safe point may be a point where the thread's state is such that safe operation can be performed on the thread. Being at a safe point does not necessarily imply releasing or acquiring safe point related resources or performing synchronization around a safe point mechanism.

As used herein, being within a thread safe point refers to a thread performing some form of synchronization that would allow other threads to know it is within the thread safe point region (and therefore known to be at a thread safe point). For example, a thread may enter a thread safe point by releasing a thread-specific safe point lock, and may leave the thread safe point by acquiring the same lock. For example: A second thread requesting a thread safe point of the first thread can do so by setting a safe point indication and acquiring the first thread's safe point lock. The safe point indication would cause the first thread to enter a thread safe point when it next at a thread safe point, thereby releasing its safe point lock. When the lock is successfully acquired by the second thread, the first thread is known to be within a thread safe point, and cannot leave the thread safe point without the second thread releasing the lock.

As used herein, blocking refers to the process of a thread intentionally stopping execution until an external interaction event or occurrence happens. For example: a thread may block waiting for a semaphore or a lock to be released such that the thread can acquire it, or data to arrive on a communication channel, or a timer to expire, etc. In some embodiments, blocking operations are typically at thread safe points, as the thread state is normally well described at the point of blocking. In some embodiments, blocking operations are typically done within a thread safe point.

Figure 1B:
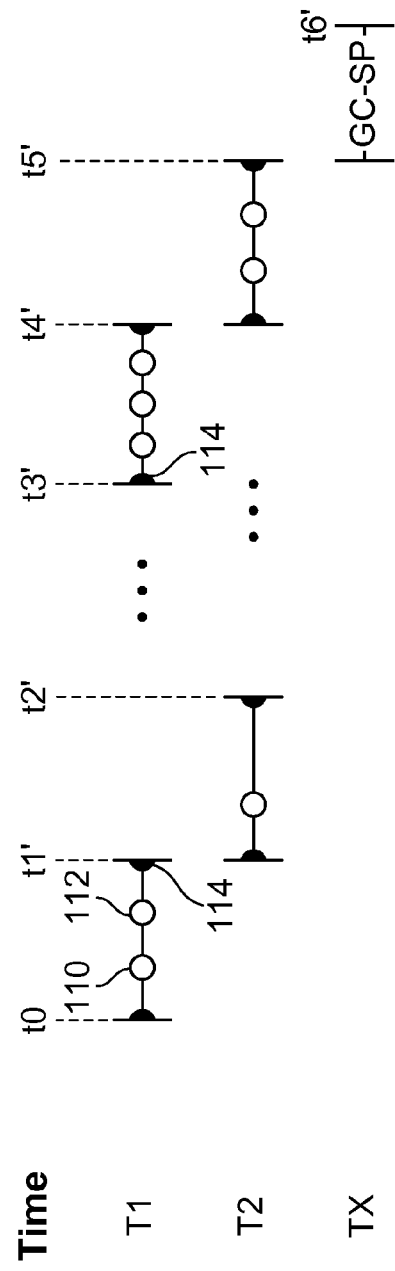
FIG. 1B is a diagram illustrating an example of a plurality of threads running on a single processor.

FIG. 1B is a diagram illustrating an example of a plurality of threads running on a single processor. In the example shown, threads T1 and T2 are cooperatively preempted, such that they are context switched only within thread safe points. Thread T1 is context switched on to the processor at time t0. At time t1', thread T1 is cooperatively preempted and context switched out and thread T2 is context switched in. At time t2', thread T2 is cooperatively preempted, context switched out and the next thread (not shown) is context switched in. Context switching proceeds through the rest of the plurality of threads.

Between time t0 and time t1', thread T1 has three potential thread safe points 110 and 112 and 114. Thread T1 enters thread safe point 114 and is content switched out at time t1'. Thread T2 has two potential thread safe point between time t1' and time t2'. Thread T2 enters a thread safe point, and is content switched out at time t2'. Thread T1 is context switched in at time t3', exits thread safe point 114, then has four potential thread safe points between time t3' and time t4'. At time t4', thread T1 enters a next thread safe point, and is context switched out. Throughout this example, context switching occurs only when threads are within their thread safe points.

At time t5', a thread TX is context switched in. Thread TX requests that all threads be at a safe point (i.e., a global safe point), e.g., to perform garbage collection. Each thread is already within a thread safe point because each thread was context switched only after entering a thread safe point. Thus when thread TX is context switched in at time t5', the machine is already at a global safe point, and safe operations (e.g., garbage collection) can be performed immediately without thread TX having to wait for a global safe point to be reached. While threads T1 and T2 may still be ready to run, they were context switched out within a thread safe point and must leave the thread safe points before they proceed beyond them. If threads T1 or T2 attempt to leave their thread safe points before thread TX releases the thread safe points, they would block and await their release. At time t6', the safe operations are complete, and thread TX releases the thread safe points and can be context switched out. Threads T1 and T2 will then be ready to run and continue normal execution.

In this example, a plurality of threads and one processor are shown. This example can be extended to any number of threads and any number of processors. For example, if there are multiple processors, then when thread TX is context switched in at time t5', each of the threads currently running on the other processors (not shown) is not necessarily within a thread safe point. Thread TX may have requested a global safe point and block until one is reached. The global safe point is reached when all currently running threads enter a thread safe point and are context switched out. Thread TX could the proceed with the safe operation. In some embodiments, the threads currently running on other processors will typically enter a thread safe point as a result on normal quantum expiry, but the process can be accelerated. For example, an operation requesting a global safe point can be accelerated by indicating to all processors that a cooperative preemption of their current threads is requested.

In this example, thread T1 is cooperatively preempted within a thread safe point at times t1' and t4'. Thread T2 is cooperatively preempted within a thread safe point at times t2' and t5'.

As used herein, cooperative preemption refers to the process of interrupting a thread's execution such that it is context switched out within a thread safe point.

Figure 2:
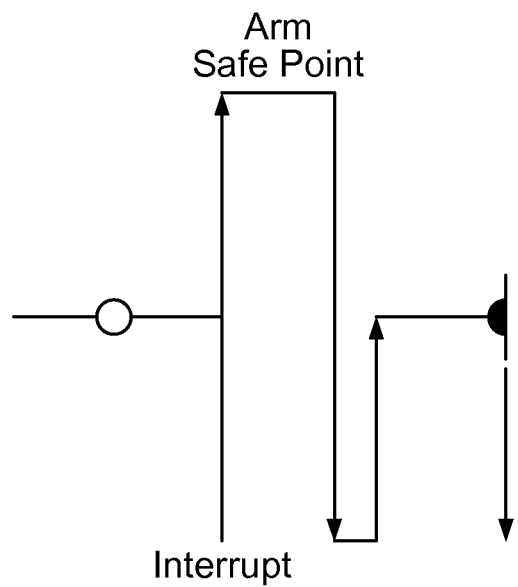
FIG. 2 is a diagram illustrating an example of arming a thread safe point.

FIG. 2 is a diagram illustrating an example of arming a thread safe point. In the example shown, at an appropriate time (e.g., when a quantum expires, or when another processor requests a preemption), an interrupt is performed and an exception handler is called that arms a safe point. For example, a flag is set to 1. The exception handler returns to the operating system, which continues thread execution. At the next thread safe point, the thread notices that the safe point is armed, enters the thread safe point, and notifies the operating system that it is within a thread safe point. The thread is then context switched out and is known to be at a thread safe point. This process is more fully described below.

Figure 3:
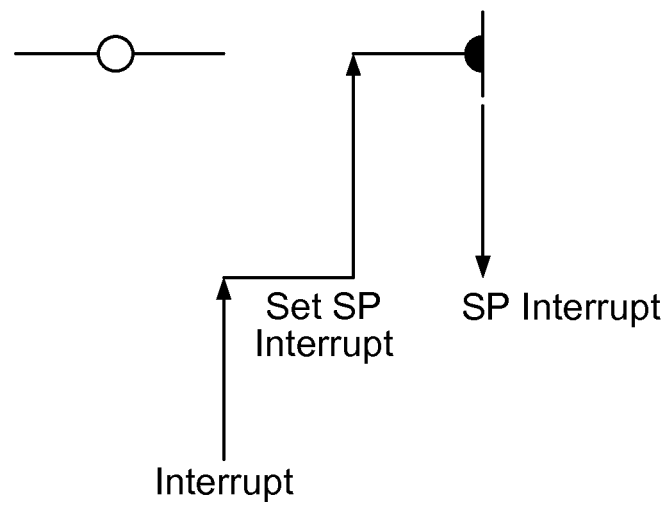
FIG. 3 is a diagram illustrating an example of arming a safe point interrupt for a thread.

FIG. 3 is a diagram illustrating an example of arming a safe point interrupt for a thread. In the example shown, at an appropriate time (e.g., when a quantum expires, or when another processor requests a preemption), an interrupt is performed. The kernel arms a safe point interrupt associated with a safe point instruction, such that when the instruction is executed, a safe point interrupt is triggered. The kernel returns from the interrupt to executing the thread. At the next thread safe point, safe point instructions are run, which triggers the safe point interrupt. The thread is context switched out at a thread safe point. This process is more fully described below.

Figure 4:
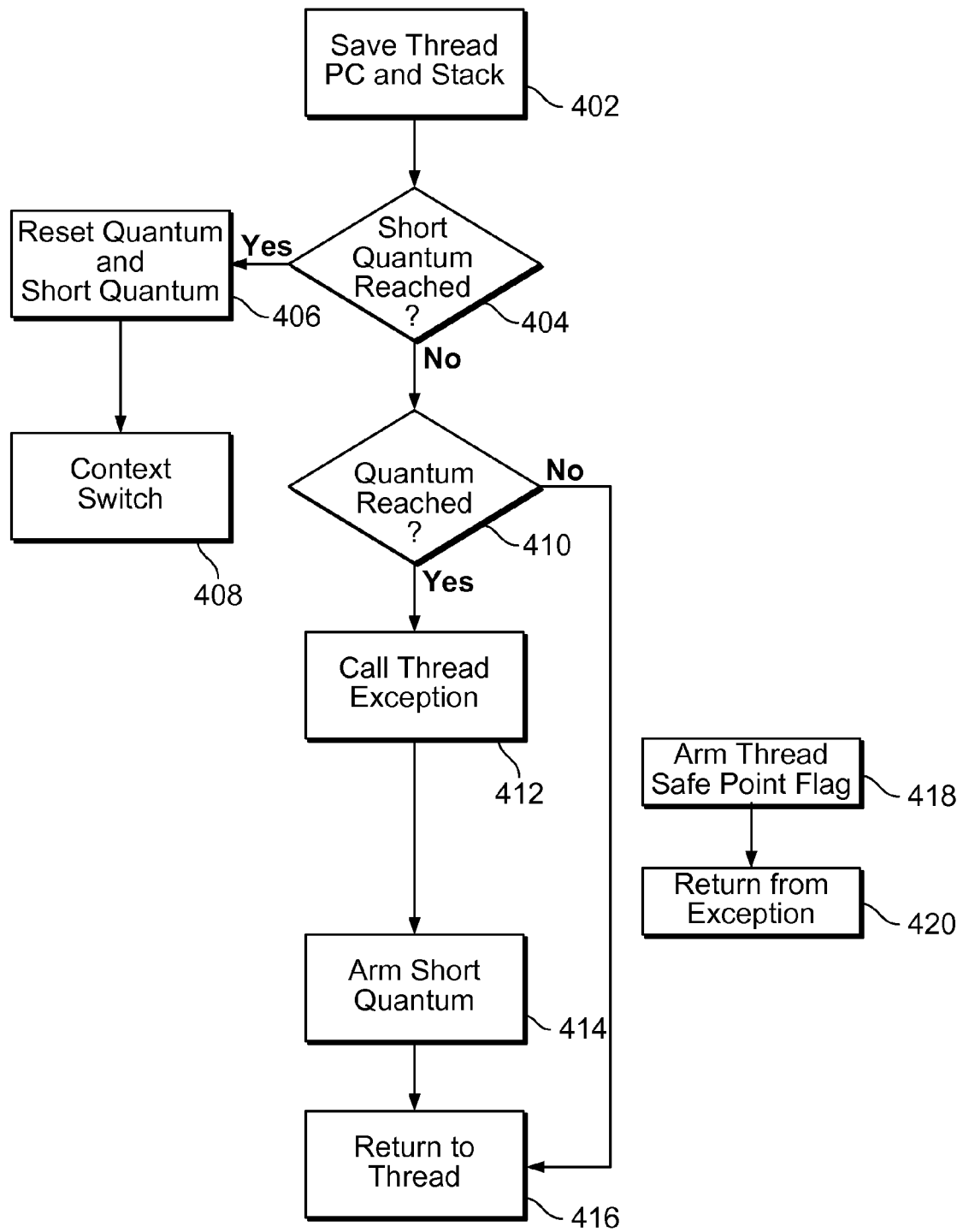
FIG. 4 is a flowchart illustrating an embodiment of a process for arming a thread safe point.

FIG. 4 is a flowchart illustrating an embodiment of a process for arming a thread safe point. In the example shown, processes 402-416 may be performed by the kernel. Processes 418-420 may be performed by a thread. At 402, a thread program counter and stack location are stored. At 404, it is determined whether a short quantum has been reached. A short quantum, as used herein, refers to a timer that may be used to ensure that the thread does not continue to run indefinitely while waiting for the next safe point in order to context switch. A short quantum may be shorter than a quantum or longer than a quantum. In some embodiments, the same timer is used for the short quantum and the quantum. If a short quantum has been reached (i.e., the short quantum timer has expired), the quantum and short quantum are reset at 406 and a context switch is performed at 408. Having a short quantum is optional.

If a short quantum has not been reached, it is determined whether a quantum has been reached at 410. If a quantum has not been reached, then the kernel returns to the thread at 416. If a quantum has been reached, then at 412, a thread exception is called. This causes a thread handler to execute. At 418, a thread safe point flag is armed (i.e., a flag is set). At 420, the thread handler returns. At 414, a short quantum is armed (i.e., the short quantum timer is reset). At 416, the kernel returns to the thread.

Figure 5:
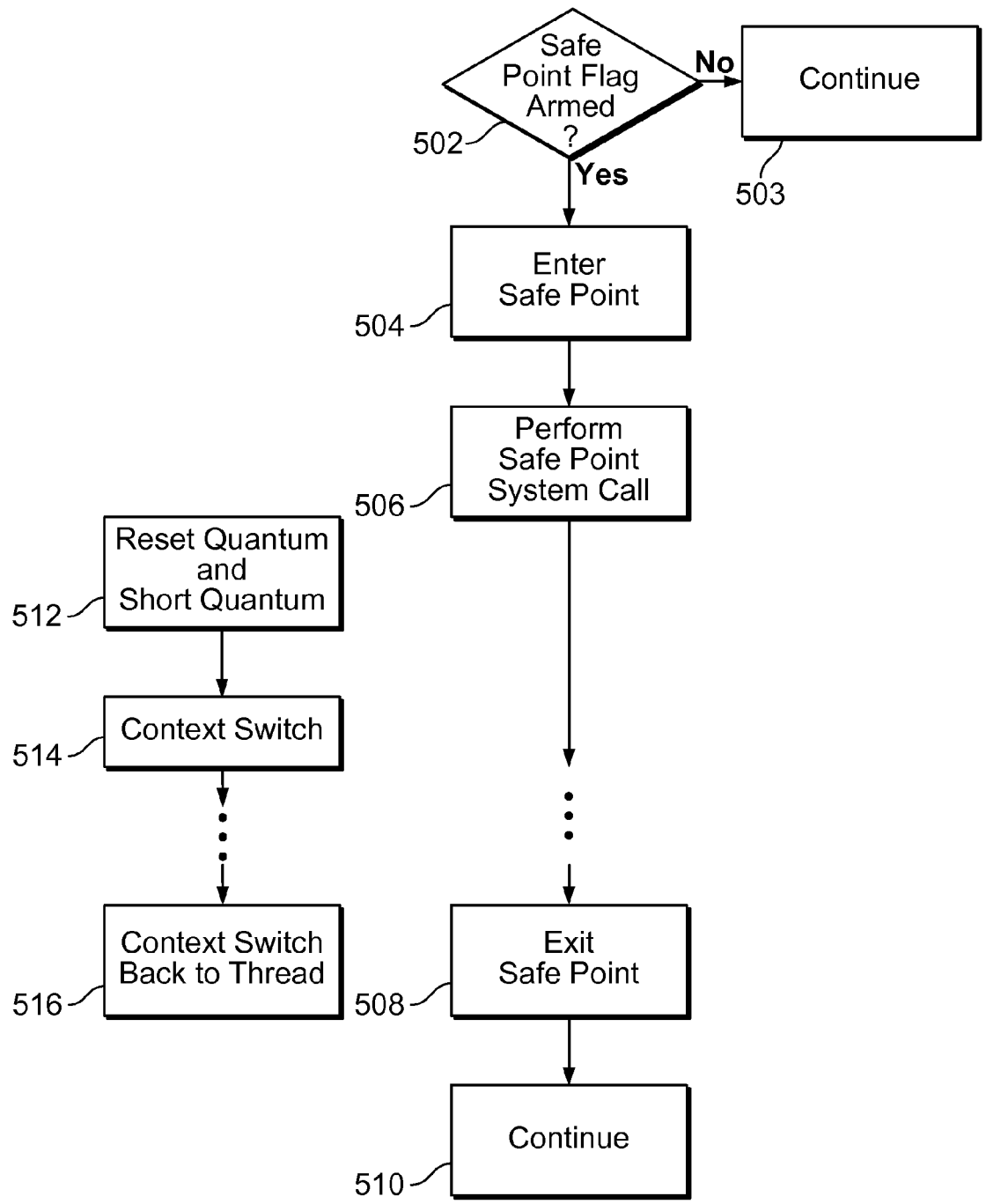
FIG. 5 is a flowchart illustrating an embodiment of a process for context switching at a thread safe point.

FIG. 5 is a flowchart illustrating an embodiment of a process for cooperatively preempting a thread such that it is context switched at a thread safe point. In the example shown, processes 512-516 may be performed by the kernel. Processes 502-510 may be performed by a thread. At 502, it is determined whether a safe point flag is armed. For example, the thread safe point flag may have been armed according to 418 of FIG. 4. If the flag has not been armed, then the process continues at 503. If the flag has been armed, then at 504, a thread safe point is entered. At 506, a safe point system call is made, causing the kernel to execute 512-516. At 512, the quantum and short quantum are reset. At 514, a context switch is performed. Later, at 516, a context switch is performed back to the thread. At 508, the thread exits the thread safe point and continues at 510.

Figure 6:
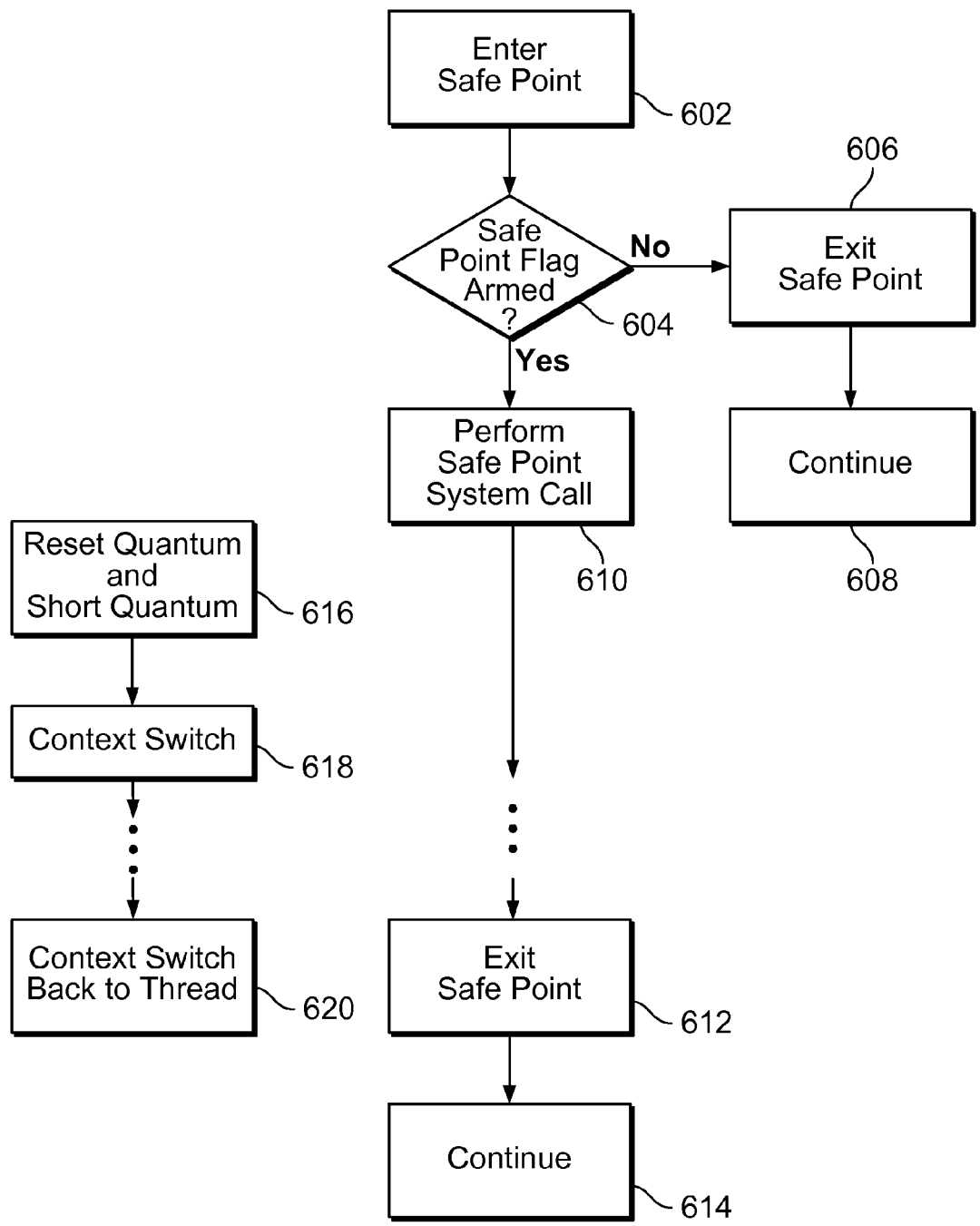
FIG. 6 is a flowchart illustrating an embodiment of a process for context switching at a thread safe point.

FIG. 6 is a flowchart illustrating an embodiment of a process for cooperatively preempting a thread such that it is context switched at a thread safe point. In the example shown, processes 616-620 may be performed by the kernel. Processes 602-614 may be performed by a thread (e.g., as part of the safe point code). At 602, a thread safe point is entered. At 604, it is determined whether a safe point flag is armed. For example, the thread safe point flag may have been armed according to 418 of FIG. 4. If the flag has not been armed, then the thread safe point is exited at 606, and the process continues at 608. If the flag has been armed, then at 610, a safe point system call is made, causing the kernel to execute 616-620. At 616, the quantum and short quantum are reset. At 618, a context switch is performed. Later, at 620, a context switch is performed back to the thread. At 612, the thread exits the thread safe point and continues at 614.

Figure 7:
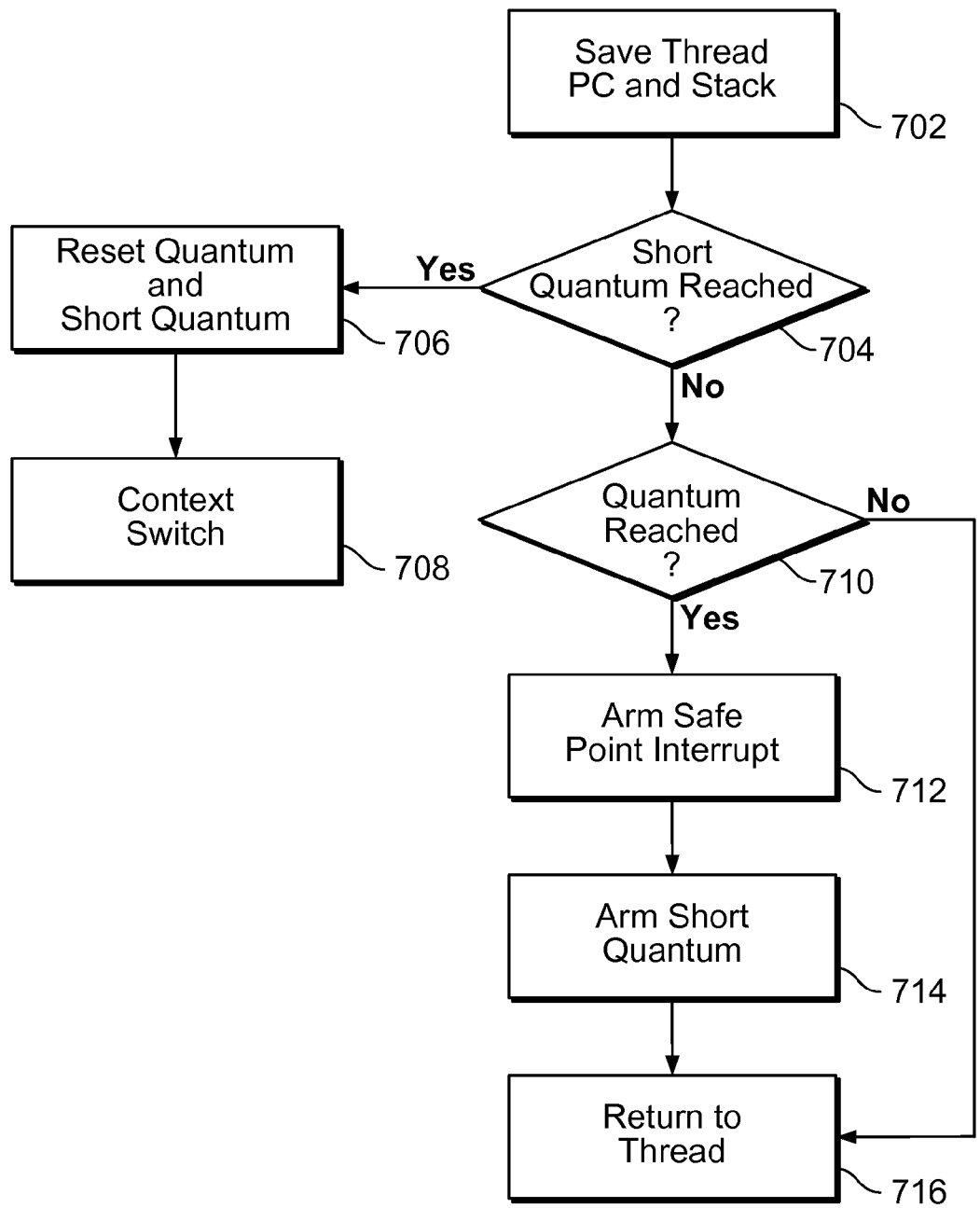
FIG. 7 is a flowchart illustrating an embodiment of a process for arming a safe point interrupt for a thread.

FIG. 7 is a flowchart illustrating an embodiment of a process for arming a safe point interrupt for a thread. In the example shown, processes 702-716 may be performed by the kernel. At 702, a thread program counter and stack location are stored. At 704, it is determined whether a short quantum has been reached (i.e., the short quantum timer has expired). If a short quantum has been reached, the quantum and short quantum are reset at 706 and a context switch is performed at 708. This context switch can occur outside of a thread safe point.

If a short quantum has not been reached, it is determined whether a quantum has been reached at 710. If a quantum has not been reached, then the kernel returns to the thread at 716. If a quantum has been reached, then at 712 a safe point interrupt is armed. The effect of arming the safe point interrupt is that when the safe point code is executed, a safe point interrupt is triggered. In some embodiments, the safe point interrupt is a selectively masked interrupt that is masked on all instructions except for the safe point instructions. At 714, a short quantum is armed (i.e., the short quantum timer is reset). At 716, the kernel returns to the thread.

Figure 8:
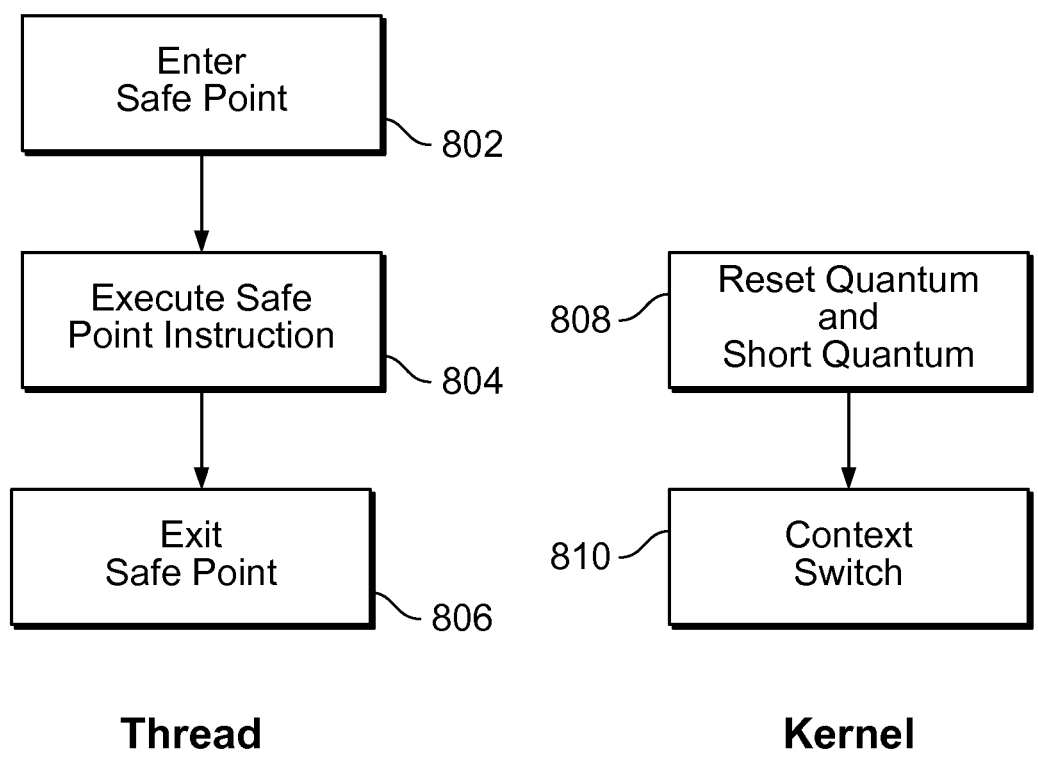
FIG. 8 is a flowchart illustrating an embodiment of a process for context switching at a thread safe point.

FIG. 8 is a flowchart illustrating an embodiment of a process for cooperatively preempting a thread such that it is context switched at a thread safe point. In the example shown, processes 802-806 may be performed by a thread. Processes 808-810 may be performed by the kernel. At 802, a safe point is entered. At 804, a safe point instruction(s) is executed. This may cause a safe point interrupt. For example, the safe point interrupt may have been armed according to 712 of FIG. 7. The kernel recognizes that it is a safe point interrupt, resets the quantum and short quantum at 808, and context switches at 810. At 806, the thread safe point is exited. In some embodiments, virtual memory protection can be used as an alternative to the safe point interrupt.

Figure 9:
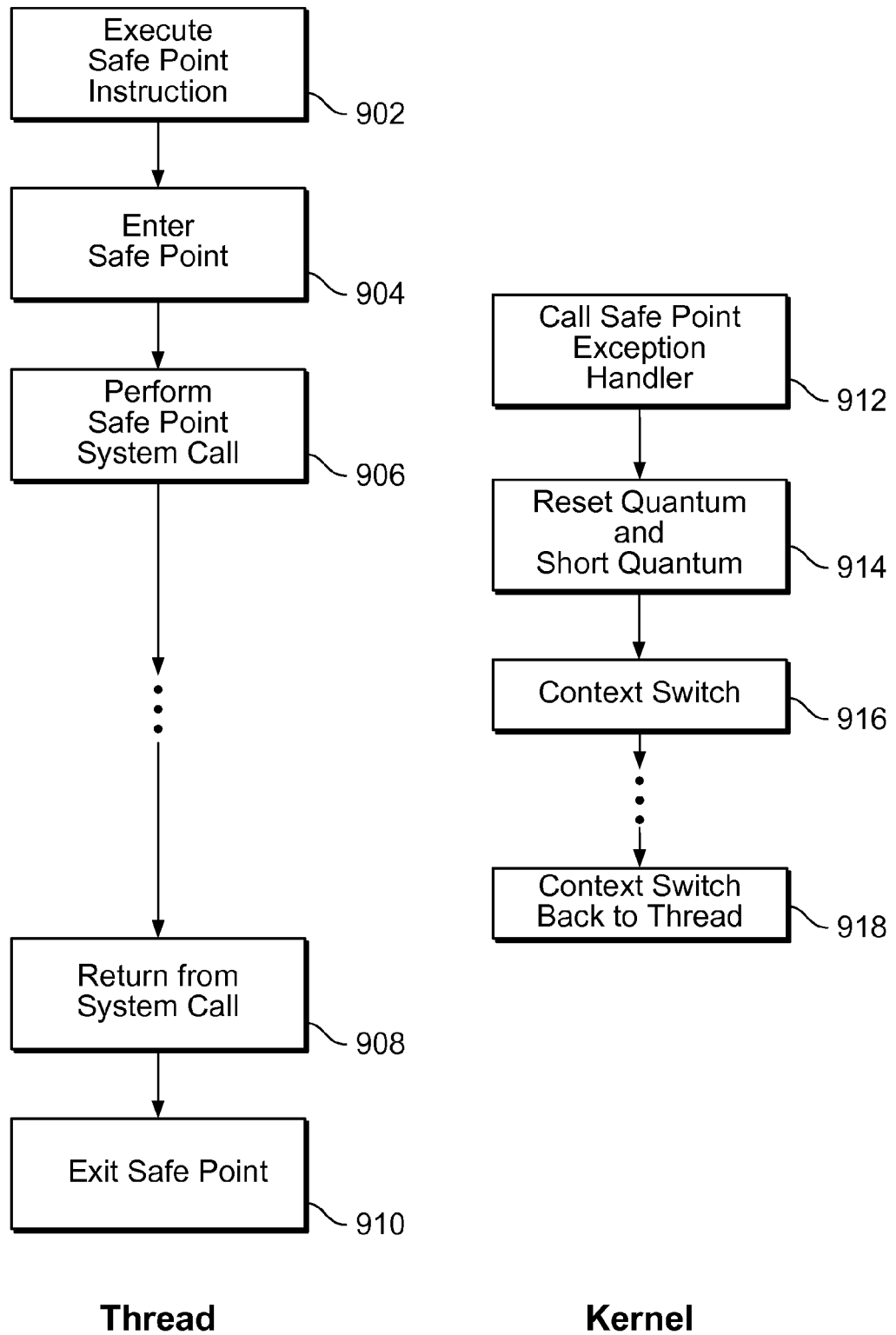
FIG. 9 is a flowchart illustrating an embodiment of a process for context switching at a thread safe point.

FIG. 9 is a flowchart illustrating an embodiment of a process for cooperatively preempting a thread such that it is context switched at a thread safe point. In the example shown, processes 902-910 may be performed by a thread. At 802, a safe point instruction(s) is executed. This causes a safe point interrupt. For example, the safe point interrupt may have been armed according to 712 of FIG. 7. At 912, a safe point exception handler is called. This causes a safe point exception handler to execute on the thread. A thread safe point is entered at 904. At 906, a safe point system call is made, causing the kernel to execute 914-918. At 914, the quantum and short quantum are reset. At 916, a context switch is performed. Later, at 918, a context switch is performed back to the thread. At 908, the system call returns and the thread exits the thread safe point at 910.

Using the methods described herein, the point at which threads are context switched can be controlled. Such methods can be useful in various applications, such as in emulators or in thread coordination in heavily multithreaded programs. For example, it may be undesirable to have a context switch occur while a thread is holding a lock (e.g., a spin lock). This can be prevented by identifying points where a lock is not held (e.g., before a lock is acquired or when after a lock is released) as points where it is acceptable to context switch. In another example, when there are a plurality of threads running on a smaller number of processors, it may be desirable to have each of the processes context switched at points at the end of a work unit. In other words, if there are 100 threads and two CPUs, a situation in which there are 98 inactive threads with partially completed work can be avoided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, including:
   receiving, at a processor, a first indication that a first thread is to be preempted;
   in response to receiving the first indication, waiting for the first thread to reach a thread safe point, the thread safe point comprising a point in code at which a state of the first thread is such that an operation by another thread can be performed on the first thread;
   in the event that the first thread reaches the thread safe point, context switching the first thread out at the thread safe point and context switching a second thread in; and
   in the event that, while waiting for the first thread to reach the thread safe point, it is detected that a second indication has been received, in response to the detection that the second indication has been received, preemptively context switching the first thread out and context switching the second thread in.

2. A method as recited in claim 1, wherein the second indication includes a timer interrupt.

3. A method as recited in claim 1, wherein the second indication includes an expiry of a quantum.

4. A method as recited in claim 1, wherein the second indication includes a request to interrupt the thread.

5. A method as recited in claim 1, wherein an operating system receives the first indication.

6. A method as recited in claim 1, wherein the first indication includes an event.

7. A method as recited in claim 1, wherein the first indication includes an event, wherein the event includes a thread of higher priority becoming ready to run.

8. A method as recited in claim 1, wherein the first indication includes a timer interrupt.

9. A method as recited in claim 1, wherein the first indication includes an expiry of a quantum.

10. A method as recited in claim 1, wherein the first indication includes a request to preempt the first thread.

11. A method as recited in claim 1, wherein the first indication includes an interrupt sent by another processor.

12. A method as recited in claim 1, further including calling a thread exception.

13. A method as recited in claim 1, wherein context switching includes setting a flag to indicate that a context switch at the thread safe point is required.

14. A method as recited in claim 1, further including the first thread checking a flag for a third indication that a context switch at the thread safe point is required.

15. A method as recited in claim 1, wherein context switching includes arming a thread safe point interrupt.

16. A method as recited in claim 1, further including the first thread executing a safe point instruction that triggers an armed safe point interrupt.

17. A method as recited in claim 1, further including calling a thread exception to indicate that a safe point interrupt has been triggered.

18. A method as recited in claim 1, wherein the first thread receives a third indication that the thread safe point is reached via a thread exception.

19. A method as recited in claim 1, wherein context switching the first thread out includes the first thread calling a system call while at a safe point.

20. A method as recited in claim 1, wherein context switching the first thread out includes the first thread calling a system call while at the thread safe point if a third indication that a context switch at the thread safe point is required.

21. A method as recited in claim 1, wherein at least one of the first thread and the second thread is running on a virtual machine.

22. A method as recited in claim 1, further including performing garbage collection.

23. A method as recited in claim 1, further including performing a debugging break point.

24. A method as recited in claim 1, wherein lock ownership within the thread safe point is avoided.

25. A method as recited in claim 1, further including sending a third indication that each of a plurality of threads is required to be at a respective thread safe point.

26. A method as recited in claim 1, further including sending a third indication that a preemption of a plurality of threads is desired.

27. A method as recited in claim 1, wherein context switching includes context switching a plurality of threads.

28. A method as recited in claim 1, further including sending a third indication that each of a plurality of threads needs to be at a respective thread safe point, wherein sending the third indication includes setting a flag.

29. A method as recited in claim 1, further including sending a third indication that each of a plurality of threads needs to be at a respective thread safe point, wherein sending the third indication includes acquiring a lock.

30. A method as recited in claim 1, further including sending a third indication that each of a plurality of threads needs to be at a respective thread safe point, wherein sending the third indication includes setting a flag per thread.

31. A method as recited in claim 1, further including sending a third indication that each of a plurality of threads needs to be at a respective thread safe point, wherein sending the third indication includes acquiring a lock per thread.

32. A method as recited in claim 1, further including sending a third indication that each of a plurality of threads is required to be at a respective thread safe point, wherein each thread that is not currently executing is at a thread safe point.

33. A method as recited in claim 1, further including sending a third indication that a global safe point is desired.

34. A system, including:
   a processor configured to:
   receive a first indication that a first thread is to be preempted;
   in response to receiving the first indication, wait for the first thread to reach a thread safe point, the thread safe point comprising a point in code at which a state of the first thread is such that an operation by another thread can be performed on the first thread;
   in the event that the first thread reaches the thread safe point, context switch the first thread out at the thread safe point and context switch a second thread in; and
   in the event that, while waiting for the first thread to reach the thread safe point, it is detected that a second indication has been received, in response to the detection that the second indication has been received, preemptively context switch the first thread out and context switch the second thread in; and
   a memory coupled with the processor, wherein the memory provides the processor with instructions.

35. A computer program product embodied in a non-transitory computer readable storage medium and comprising computer instructions for:
   receiving, at a processor, a first indication that a first thread is to be preempted;
   in response to receiving the first indication, waiting for the first thread to reach a thread safe point, the thread safe point comprising a point in code at which a state of the first thread is such that an operation by another thread can be performed on the first thread;

in the event that the first thread reaches the thread safe point, context switching the first thread out at the thread safe point and context switching a second thread in; and in the event that, while waiting for the first thread to reach the thread safe point, it is detected that a second indication has been received, in response to the detection that the second indication has been received, preemptively context switching the first thread out and context switching the second thread in.

* * * * *